Dec. 4, 1928.
C. KLEIN
1,694,342
TRUCK
Filed Sept. 3, 1926
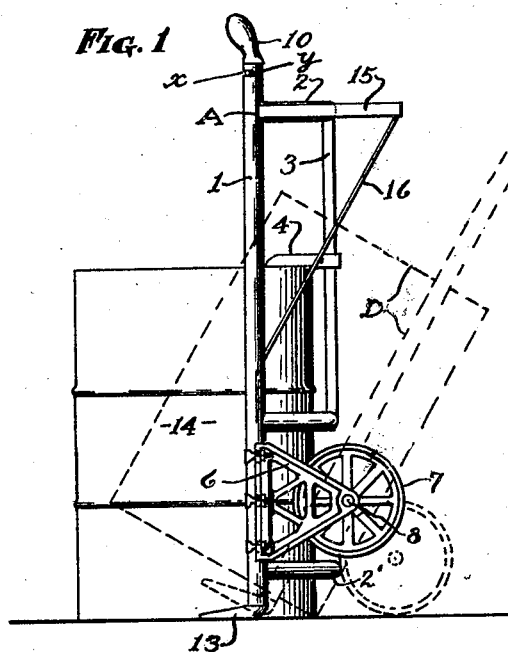
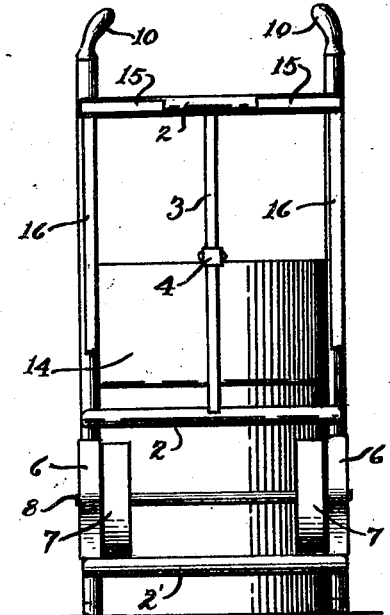
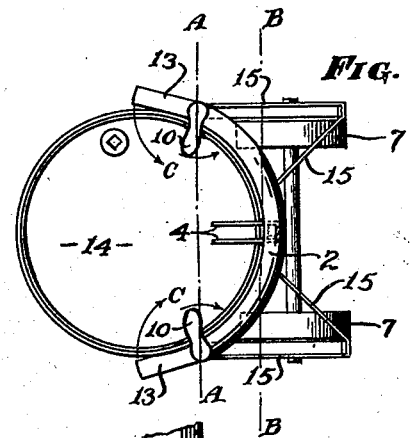
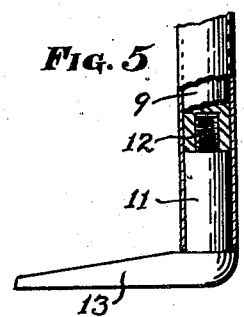
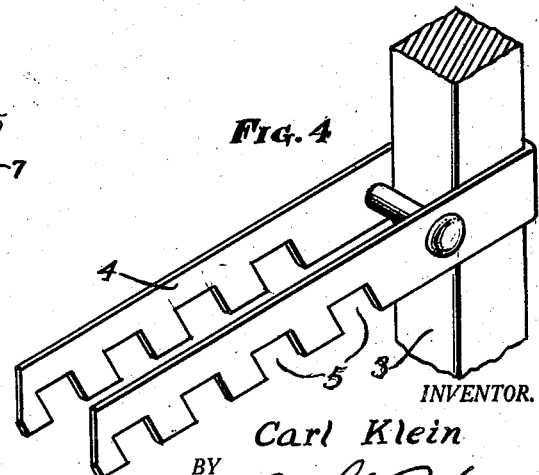
INVENTOR.
Carl Klein
BY
ATTORNEY.

Patented Dec. 4, 1928.

1,694,342

UNITED STATES PATENT OFFICE.

CARL KLEIN, OF WICHITA, KANSAS.

TRUCK.

Application filed September 3, 1926. Serial No. 133,463.

My invention relates to improvements in trucks, adapted for the cartage of barrels, and has for its chief object means for tilting and supporting the barrel while being loaded on the truck.

A further object of my invention is to provide a truck that can be attached to a barrel that is standing on end, hold it properly loaded while the truck is being rocked rearward to conveying position eliminating the handling of the barrel by hand.

These and other objects will hereinafter be more fully explained.

Referring to the drawings:

Fig. 1 is a side elevation of the truck positioned at the side of a barrel.

Fig. 2 is a rear elevation of the truck and barrel.

Fig. 3 is a plan view of Fig. 1.

Fig. 4 is an enlarged detailed view of the chime hooks.

Fig. 5 is an enlarged detailed view of the toe members, parts broken away for convenience of illustration.

The truck herein described consists of a pair of tubular side arms 1; said arms being parallel and rigidly connected by arcuated members 2 and 2'. The members 2 are connected centrally by a bar 3 on which is slidably mounted a U-shaped member 4 the blades of which functioning as hooks have a plurality of notches 5 along the edges thereof to engage over the chime of the barrel as tilting means therefor as the truck is rocked rearward.

Rigidly attached to the arms and centrally positioned between the arcuated members 2 and 2' are brackets 6 functioning as bars for the wheels 7 trunnioned therein as at 8. Rotatably mounted in the hollow of the side arms 1 are shafts 9 having handles 10 rigidly connected and laterally extending therefrom as turning means for the shafts. On the opposite ends of the shafts are positioned shanks 11 threadedly engaging in the ends of said shafts as at 12 and in axial alignment therewith; the said shanks having laterally extending toe members 13 which rotate with the shafts when actuated by the handles 10. The said handles also function as grips for the truck while transporting the load. The toe members function as supporting means engaging beneath the head of a barrel 14 which when loaded on the truck will rest in the arcuated members heretofore described.

Adjacent the rear end of the tubular side arms is a slot X extending about one quarter of the circumference. The said slot is adapted to engage a pin Y that is rigidly positioned in the shaft 9. The said slot and pin function as stopping means for the rotation of the shaft 9 for correct engagement of the toes under the barrel.

Rigidly connected to the ends of the side arms as at A are supporting arms 15 functioning as a bearing for a parallel position of said arms with the floor when rocked downward. The supporting arms are braced to the side arms by means of rods 16 which are rigidly attached at both ends.

The operation of the mechanism herein disclosed will be as follows, reference being had to the drawings.

The truck when conveyed to a barrel is tilted on end as shown in Figs. 1 and 3 with the toe members engaging on the floor and turned outward to span the periphery of the barrel. The hook is then slid downward on its respective bar until one pair of its notches will engage over the chime of the barrel. Then by rocking the truck rearward to a position shown by dotted lines B, the toe member may be rocked in the direction of the arrows C to engagement beneath the barrel to prevent it from sliding downward when the truck is rocked rearward to a transporting position. It will be understood that the curved or arcuated members are not merely made arcuated for the purpose of forming a seat on which the barrel will rest, but they are arcuated: first, to provide bearing points for the truck on the line A—A in the horizontal plane, which is the floor, and to provide bearing points for the barrel located on the line B—B in the horizontal plane, the lines A—A and B—B being spaced apart. This could be accomplished by using straight line members instead of arcuated members, although arcuated members are necessary for the second reason, as follows:

In handling barrels whose radii are smaller than that of the arcuated members on the truck, the barrel will locate itself centrally between the side members of the truck so that when the toes are turned in they will both catch under the barrel and hold it from slipping downward off the truck. Straight line members instead of arcuated members would not handle the small barrels correctly as the barrel could roll from one side to the other and only one toe would engage the bottom thereof and would then be likely to take a slanting position across the truck, which would then be undesirable for handling the barrel; but the arcuated members will cause the barrel to roll to the middle and therefore be in alignment with the truck. It will be understood that the hook member slidably engages on the barrel and will accommodate for longitudinal movement of the barrel when loading same.

To detach from the barrel the truck is rocked upward to a similar position as when being loaded or until the barrel rests on the floor releasing its bearing on the toe members, at which time the said toes will be rocked outward from under the barrel allowing it to rest uprightly on the floor, then by raising the hook member the truck may be removed.

Such modifications may be employed as lie within the scope of the appended claims.

Having thus described my invention, what I claim as new and desire to secure by Letters Patent, is:—

1. In a mechanism of the kind described, a truck having a frame with tubular side arm members and arcuate cross members to receive and support a barrel, a bar member carried by the arcuate members of the frame, and a hook member to slidably and rockably engage on the bar member, the hook to engage with the chime of a barrel to rock the same rearward with the truck, a shaft rotatably engaging in each of the side arm members, a toe member laterally extending and integrally connected to the front end of each of the shafts, a curved portion at the opposite end of each of the shafts functioning as handles and turning means for the shafts to rock the toes beneath the chime of a barrel as it is rocked rearward.

2. In a truck, a frame and a pair of wheels spaced rearward a short distance from the front end of the frame, hollow side arms for the frame, a shaft rotatably mounted within each of the arms, a toe member transversely positioned to the shafts and integrally connected at one end of each thereof, a heel for the toe member in axial alignment with the shaft, a curved portion at the opposite end of each shaft transversely positioned to the toe members and serving as means to rock the toes inward as the truck is rocked rearward by the said curved portions, a hook member slidably and rockably carried by the frame and adapted to engage with the chime of a barrel when the truck is vertically positioned to the side thereof, the hook functioning as rocking means for the barrel as the truck is rocked rearward thereby, the heels functioning as fulcrum points at which time the toes are free to rock beneath the barrel while being loaded on the truck.

CARL KLEIN.